(12) United States Patent
Kim et al.

(10) Patent No.: US 9,207,372 B2
(45) Date of Patent: Dec. 8, 2015

(54) LIGHT REFLECTIVE MATERIAL, AND PREPARATION METHOD THEREOF

(75) Inventors: Keun-Tae Kim, Seoul (KR); Tae-Yeon Kim, Seoul (KR); Hya-Yeon Lee, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 467 days.

(21) Appl. No.: 13/702,386

(22) PCT Filed: Jun. 8, 2011

(86) PCT No.: PCT/KR2011/004165
§ 371 (c)(1),
(2), (4) Date: Dec. 6, 2012

(87) PCT Pub. No.: WO2011/159053
PCT Pub. Date: Dec. 22, 2011

(65) Prior Publication Data
US 2013/0077167 A1 Mar. 28, 2013

(30) Foreign Application Priority Data

Jun. 18, 2010 (KR) .................. 10-2010-0058187

(51) Int. Cl.
| | |
|---|---|
| *G02B 5/12* | (2006.01) |
| *B32B 3/30* | (2006.01) |
| *B32B 27/08* | (2006.01) |
| *B32B 27/20* | (2006.01) |
| *B05D 5/06* | (2006.01) |
| *G02B 5/128* | (2006.01) |

(Continued)

(52) U.S. Cl.
CPC *G02B 5/12* (2013.01); *B05D 5/063* (2013.01); *B32B 3/30* (2013.01); *B32B 27/08* (2013.01); *B32B 27/20* (2013.01); *E01F 9/015* (2013.01); *G02B 5/0226* (2013.01); *G02B 5/0284* (2013.01); *G02B 5/128* (2013.01); *B32B 2250/02* (2013.01); *B32B 2250/24* (2013.01); *B32B 2255/10* (2013.01); *B32B 2264/067* (2013.01); *B32B 2264/101* (2013.01); *B32B 2305/30* (2013.01); *B32B 2307/416* (2013.01)

(58) Field of Classification Search
None
See application file for complete search history.

(56) References Cited

U.S. PATENT DOCUMENTS

| | | | |
|---|---|---|---|
| 4,519,154 A * | 5/1985 | Molari, Jr. | ....................... 40/615 |
| 2004/0175541 A1* | 9/2004 | Smeenk et al. | ................ 428/141 |

FOREIGN PATENT DOCUMENTS

| | | |
|---|---|---|
| CN | 201040832 Y | 3/2008 |
| CN | 201117196 Y | 9/2008 |
| JP | 3-79320 U | 8/1991 |

(Continued)

OTHER PUBLICATIONS

Japanese Office Action dated Dec. 3, 2013.

(Continued)

*Primary Examiner* — Jennifer L. Doak
(74) *Attorney, Agent, or Firm* — Hauptman Ham, LLP (57) ABSTRACT

Disclosed are a light reflective material which shows the color and texture of a base material thereof in the daytime and acts as a light reflector at night, and a preparation method thereof. According to embodiments of the present invention, the preparation method includes preparing an extrusion base material such as plastic or synthetic wood, and supplying a light reflecting element such as glass beads on the surface of the extrusion base material and passing the extrusion base material through an extruder to form a light-reflective layer on the surface of the extrusion base material.

14 Claims, 8 Drawing Sheets

(51) Int. Cl.
*E01F 9/015* (2006.01)
*G02B 5/02* (2006.01)

(56) References Cited

FOREIGN PATENT DOCUMENTS

| JP | 10-39124 | 2/1998 |
|---|---|---|
| JP | 2001-281428 | 10/2001 |
| JP | 2002-79605 | 3/2002 |
| JP | 2004011182 A | 1/2004 |
| JP | 2004-62123 | 2/2004 |
| JP | 2005-9266 | 1/2005 |
| JP | 2005090155 A | 4/2005 |
| KR | 10-0457636 | 11/2004 |
| RU | 2182944 C2 | 5/2002 |
| RU | 73347 U1 | 5/2008 |
| RU | 2008115029 A | 12/2009 |

OTHER PUBLICATIONS

International Search Report mailed Feb. 17, 2012 for PCT/KR2011/004165.
Chinese Office Action dated Dec. 31, 2014.
Russian Notice of Allowance dated Jul. 23, 2014.
Chinese Office Action dated Jul. 16, 2015 in connection with the counterpart Chinese Patent Application No. 201180029793A, citing the above reference(s).

\* cited by examiner

LIGHT REFLECTIVE MATERIAL, AND PREPARATION METHOD THEREOF

TECHNICAL FIELD

The present invention relates to a light reflective material, which can be recognized as a base material such as plastic or synthetic wood in the daytime and can act as a light reflector night, and a method of manufacturing the same.

BACKGROUND ART

In general, a lot of structures such as signal lamps, traffic signs and the like are positioned on a road.

These structures are made of various materials such as wood, synthetic resins, metal, etc.

Initially, these structures were mainly made of wood. However, structures fabricated of wood are very susceptible to humidity.

As an alternative to a material for such road structures, synthetic wood has been proposed because it provides natural texture and resists humidity.

However, it is difficult to apply general synthetic wood to a traffic light and similar structures, which have to be recognized at night, since general synthetic wood has no light reflecting function.

DISCLOSURE

Technical Problem

The present invention is directed to providing a light reflective material, which provides the color and texture of a base material in the daytime and acts as a light reflector at night.

Further, the present invention is directed to providing a method of manufacturing the light reflective material through coextrusion.

Technical Solution

One aspect of the present invention provides a light reflective material including an extrusion base material; and a light-reflective layer formed on a surface of the extrusion base material.

Another aspect of the present invention provides a method of manufacturing a light reflective material, which includes: preparing an extrusion base material; and supplying a light reflecting element on a surface of the extrusion base material and passing the extrusion base material through an extruder to form a light-reflective layer on the surface of the extrusion base material.

Advantageous Effects

According to the present invention, a light reflective material may be easily manufactured by coextrusion of an extrusion base material, such as plastic or synthetic wood, together with a light reflecting element such as glass beads.

According to the present invention, synthetic wood having a light reflecting function may provide the color and texture of a base material thereof in the daytime while acting act as a light reflector through the light reflecting function at night.

BEST MODE

The above and other aspects, features, and advantages of the invention will become apparent from the detailed description of the following embodiments in conjunction with the accompanying drawings. It should be understood that the present invention is not limited to the following embodiments and may be embodied in different ways, and that the embodiments are provided to provide complete disclosure of the invention and a thorough understanding of the invention to those skilled in the art. The scope of the invention is defined only by the claims. Like components will be denoted by like reference numerals throughout the specification.

Next, a light reflective material according to one embodiment of the present invention and a method of manufacturing the same will be described in more detail with reference to the accompanying drawings.

Figure 1:
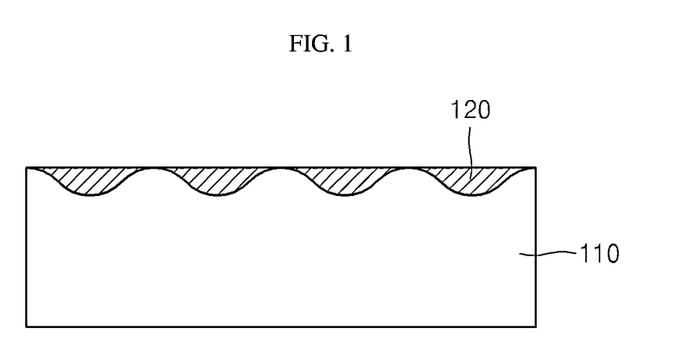
FIG. 1 schematically shows a light reflective material according to one embodiment of the present invention.

FIG. 1 schematically shows a light reflective material according to one embodiment of the present invention.

Referring to FIG. 1, the light reflective material according to one embodiment includes an extrusion base material 110 and a light-reflective layer 120.

The extrusion base material 110 may include a plastic material or synthetic wood, which can be processed by an extrusion process. Any extrusion base material 110 may be used so long as the material can be processed by the extrusion process.

When the extrusion base material is synthetic wood, the synthetic wood may include wood flour and a resin. Specifically, the synthetic wood may contain 20~50 parts by weight of the resin based on 100 parts by weight of the wood flour. Preferably, the ratio of the wood flour to the resin may be 7:3 in terms of weight.

The wood flour is obtained by pulverizing natural wood or the like, and serves to impart a texture of natural wood.

The resin acts as a binder. The resin may include at least one selected from the group consisting of polypropylene (PP), polyethylene (PE), polyvinyl chloride (PVC), polycarbonate (PC), polyethylene terephthalate (PET), poly lactic acid (PLA), and mixtures thereof.

In manufacture of the synthetic wood, the resin may be added in an amount of 20 to 50 parts by weight based on 100 parts by weight of the wood flour. If the amount of the synthetic resin exceeds 50 parts by weight based on 100 parts by weight of the wood flour, the effect of providing a texture of natural wood can be deteriorated. On the other hand, if the amount of the synthetic resin is less than 20 parts by weight, compatibility with other components can be deteriorated.

The light-reflective layer 120 is formed on a surface of the extrusion base material 110.

Since an object of the present invention is to allow a light reflective material to act as a light reflector at night while providing a color and texture of the extrusion base material such as synthetic wood in the daytime, the light-reflective layer 120 may be formed in the form of plural rows separated from each other.

When the light-reflective layer 120 is formed over the entire surface of the extrusion base material 110, a light reflecting effect at night can be improved. In this case, however, the area of the light-reflective layer 120 becomes too large to provide natural texture in the daytime.

The light-reflective layer 120 may include glass beads which have excellent transparency and reflectance to visible light.

The surface of the light-reflective layer 120 may be coated with a light diffusing agent such as acrylic organic particles or silicon organic particles. This structure may enhance a light diffusing effect and secure a wide viewing angle.

As shown in FIG. 1, the extrusion base material 110 may be formed with a groove pattern on the surface thereof, and the light-reflective layer 120 may be formed on a recessed portion of the groove pattern on the surface of the extrusion base material 110.

At this time, the surface of the extrusion base material and the surface of the light-reflective layer may be flattened. This structure may be achieved by a shape of an extruder or by a sanding process.

FIG. 1 illustrates that the surface of the extrusion base material 110 is provided with a curved groove pattern, but the present invention is not limited thereto. Alternatively, the surface of the extrusion base material 110 may have various groove patterns such as a rectangular groove pattern, a triangular groove pattern, etc., which can be obtained by an extrusion process. Also, the surface of the extrusion base material 110 may be flat.

Figure 2:
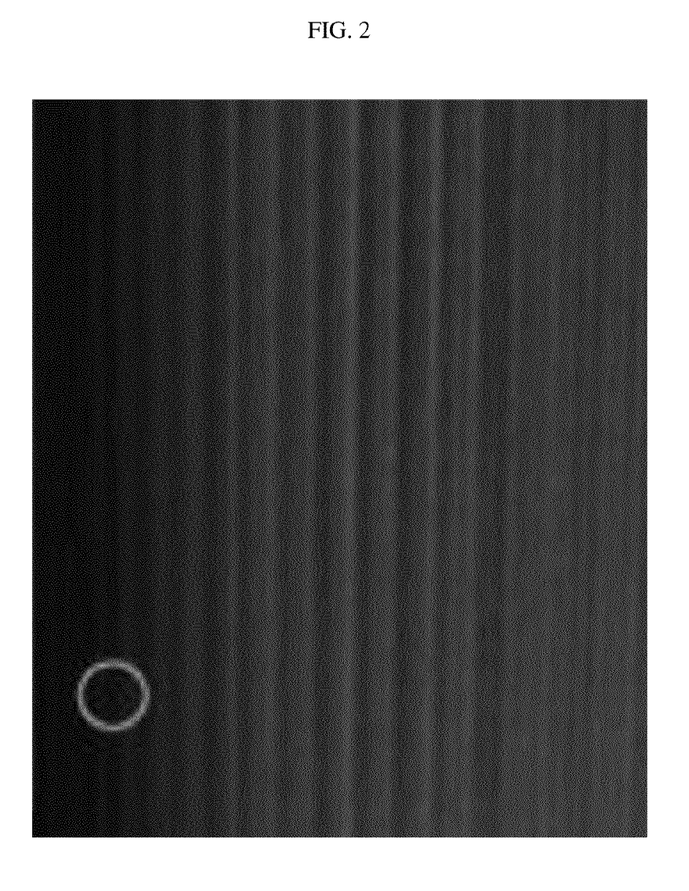
FIG. 2 is a picture of synthetic wood having a light reflecting function according to one embodiment of the present invention photographed in the daytime.
Figure 3:
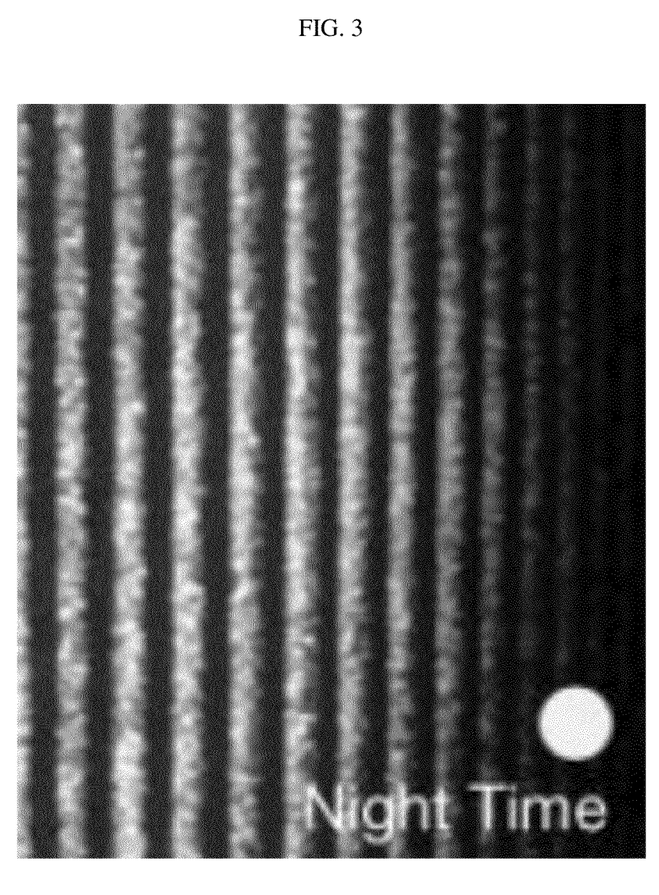
FIG. 3 is a picture of the synthetic wood having the light reflecting function according to the embodiment of the present invention photographed at night.

FIGS. 2 and 3 show synthetic wood having a light reflecting function as one example of the light reflective material according to the present invention. FIG. 2 is a picture of synthetic wood having a light reflecting function according to one embodiment of the present invention photographed in the daytime, and FIG. 3 is a picture of the synthetic wood having the light reflecting function according to the embodiment of the present invention photographed at night.

Referring to FIGS. 2 and 3, the synthetic wood having a light reflecting function may provide a pleasant appearance since the synthetic wood may provide a texture of natural wood in the daytime while acting as a light reflector at night.

Figure 4:
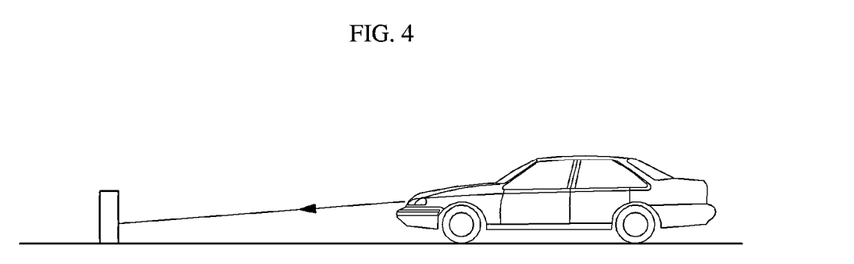
FIG. 4 schematically shows a reflective angle of a general wood structure with respect to a vehicle driving at night.
Figure 5:
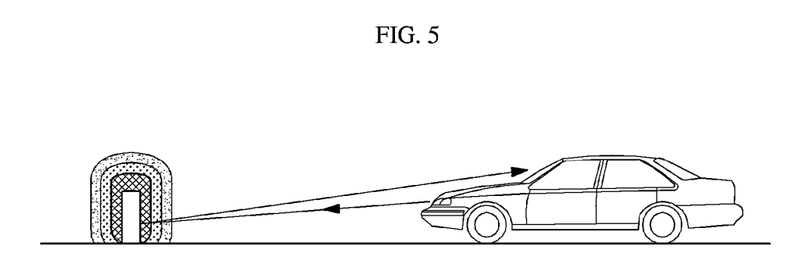
FIG. 5 schematically shows a reflective angle of a synthetic wood structure having a light reflecting function with respect to a vehicle driving at night, according to one embodiment of the present invention.

FIG. 4 schematically shows a reflective angle of a general wood structure with respect to a vehicle driving at night, and FIG. 5 schematically shows a reflective angle of a synthetic wood structure having a light reflecting function with respect to a vehicle driving at night, according to one embodiment of the present invention.

In general, natural wood or synthetic wood has an insufficient reflecting function. Therefore, even though light emitted from a vehicle reaches the natural wood or synthetic wood, the light reflected from the natural wood or synthetic wood is not directed to a drive.

However, the synthetic wood structure having a light reflecting function can serve as a luminous body through the glass beads or the like provided to the light-reflective layer. Thus, when light emitted from a vehicle reaches the synthetic wood structure, the light reflected from the synthetic wood structure can be easily directed to a driver.

Next, a method of manufacturing a light reflective material according to one embodiment of the present invention will be described.

Figure 6:
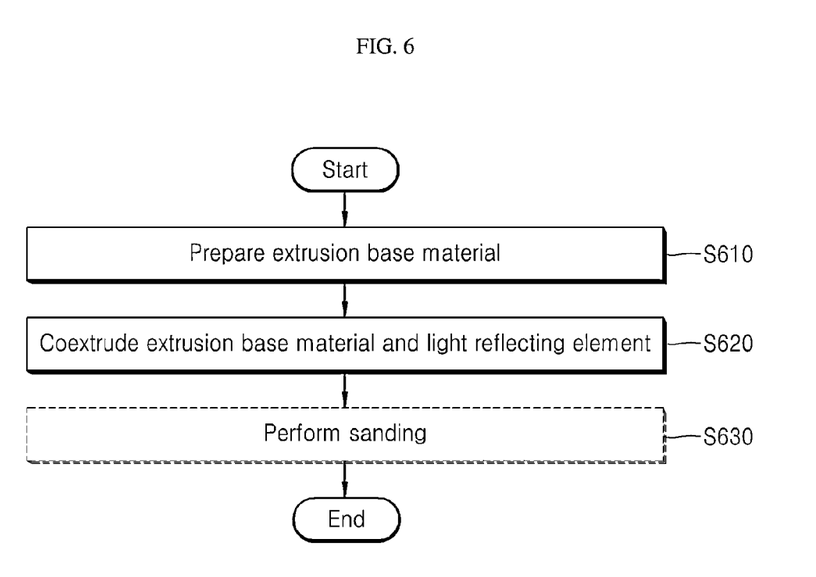
FIG. 6 is a flowchart of a method of manufacturing a light reflective material according to one embodiment of the present invention.

FIG. 6 is a flowchart of a method of manufacturing a light reflective material according to one embodiment of the present invention.

Referring to FIG. 6, the method includes preparing an extrusion base material (S610); and coextruding the extrusion base material and a light reflecting element (S620).

In operation of preparing the extrusion base material (S610), the extrusion base material such as a plastic material or synthetic wood containing wood flour and a resin, which can be processed by an extrusion process, is prepared. Such an extrusion base material may also be prepared by the extrusion process.

The surface of the extrusion base material may be formed with various groove patterns such as a curved groove pattern, a rectangular groove pattern, a triangular groove pattern, etc. In this case, the groove pattern may be formed by various methods. For example, while the extrusion base material is manufactured, the groove pattern may be formed by passing the synthetic wood containing the wood flour and the resin through an extruder having a pattern corresponding to a desired groove pattern.

Figure 7:
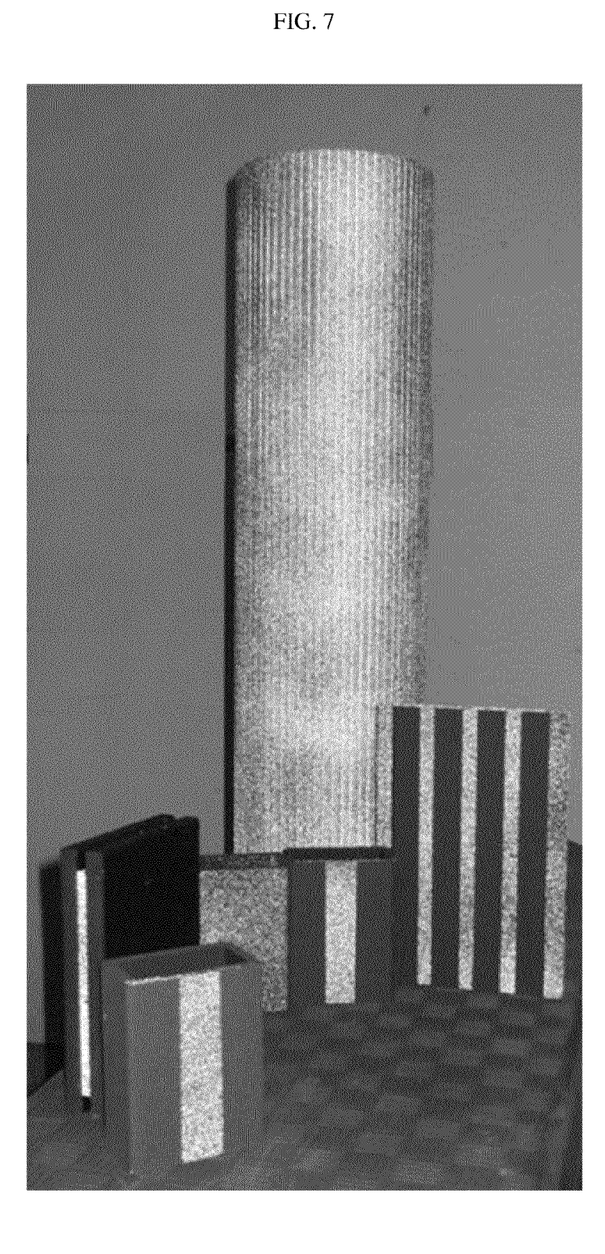
FIG. 7 shows various examples of the light reflective material manufactured by the method according to the embodiment of the present invention.

In this embodiment, the surface of the extrusion base material is illustrated as being formed with the groove pattern, but the present invention is not limited thereto. Alternatively, the surface of the extrusion base material may be flat or have other shapes. As a result, the light reflective material may be manufactured into various shapes, as shown in FIG. 7.

When the extrusion base material is synthetic wood, the synthetic wood may contain 20 to 50 parts by weight of the resin based on 100 parts by weight of the wood flour. The wood flour may be obtained by pulverizing natural wood or the like. The resin may include polypropylene (PP), polyethylene (PE), polyvinyl chloride (PVC), polycarbonate (PC), polyethylene terephthalate (PET), poly lactic acid (PLA), etc.

Next, in operation of coextruding the extrusion base material and the light reflecting element (S620), the light-reflective layer is formed on the surface of the extrusion base material by supplying the light reflecting element on the surface of the extrusion base material and passing the extrusion base material through the extruder. The light reflecting element may include glass beads.

The shape of the light-reflective layer is determined corresponding to the shape of the extruder.

When the surface of the extrusion base material is formed with a curved groove pattern and the extruder has a pattern corresponding to the curved groove pattern, the light-reflective layer may be formed to have a curved shape. Likewise, this may be applied when a groove pattern of a different shape is formed on the surface of the extrusion base material.

On the other hand, when such a pattern is not formed on the extruder, extrusion thickness or the like is controlled to adjust the shape or thickness of the light-reflective layer.

Through the operation of coextruding the extrusion base material and the light reflecting element (S620), it is possible to achieve a leaner light-reflective pattern. Also, through coextrusion, it is possible to obtain a structure in which the extrusion base material, the light-reflective layer and the extrusion base material are sequentially stacked, as shown in FIG. 7.

At this time, the extrusion base material is partially exposed such that the color and natural texture of the extrusion base material such as synthetic wood can be exhibited in the daytime. To this end, the method may further include sanding (S630) for flattening the surface of the light-reflective layer until some of the extrusion base material is exposed.

Figure 8:
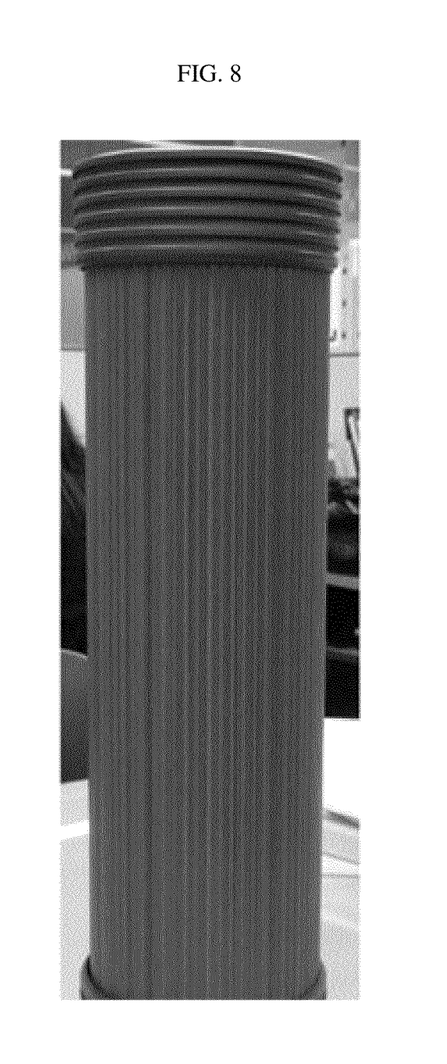
FIG. 8 is a picture of a synthetic wood structure manufactured by the method according to the embodiment of the present invention photographed in the daytime.
Figure 9:
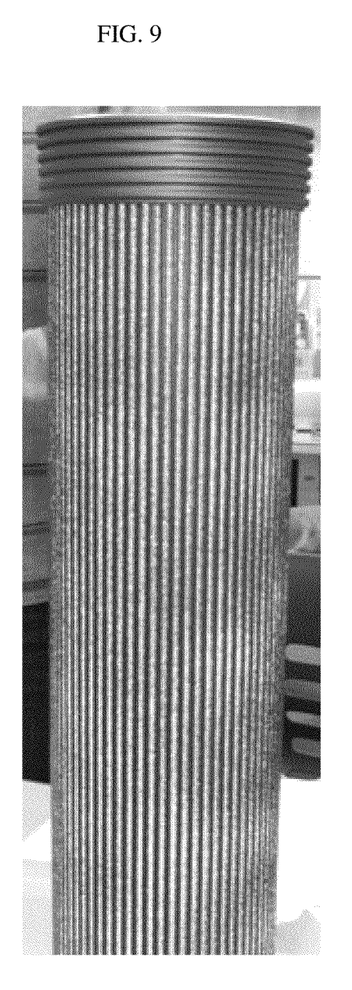
FIG. 9 is a picture of the synthetic wood structure manufactured by the method according to one embodiment of the present invention photographed at night.

FIG. 8 is a picture of a synthetic wood structure manufactured by the method according to the embodiment of the present invention photographed in the daytime, and FIG. 9 is a picture of the synthetic wood structure manufactured by the method according to one embodiment of the present invention photographed at night.

Referring to FIGS. 8 and 9, the synthetic wood structure manufactured according to one embodiment of the present invention has a synthetic wood's own color in the daytime, and serves as a light reflector.

Accordingly, the synthetic wood having a light reflecting function serves not only as a structure for providing natural texture in the daytime, but also as a light reflector at night, and is thus applied to safety facilities such as a post for a traffic lighting fixture, a pillar for a traffic sign, a fence post, a panel for a soundproofed wall, an extruded material for a guardrail, etc.

Although the present invention has been described with reference to some embodiments in conjunction with the drawings, it should be understood that these embodiments are given by way of illustration only and do not limit the scope of the invention, and that various modifications, variations, and alterations can be made by a person having ordinary knowledge in the art without departing from the spirit and scope of the invention. Therefore, the scope of the invention should be limited only by the accompanying claims and equivalents thereof.

The invention claimed is:

1. A light reflective material comprising:
   an extrusion base material; and
   a light-reflective layer formed on a surface of the extrusion base material,
   wherein the light-reflective layer is provided in a form of plural rows separated from each other;
   wherein the extrusion base material comprises a groove pattern on a surface thereof, and the light-reflective layer is formed in a recessed portion of the groove pattern such that the extrusion base material is at least partially exposed through the light reflective layer; and
   wherein the extrusion base material and the light-reflective layer comprise flattened surfaces.

2. The light reflective material of claim 1, wherein the extrusion base material comprises synthetic wood comprising wood flour and a resin.

3. The light reflective material of claim 2, wherein the extrusion base material comprises 20 to 50 parts by weight of the resin based on 100 parts by weight of the wood flour.

4. The light reflective material of claim 1, wherein the resin comprises at least one material selected from among polypropylene (PP), polyethylene (PE), polyvinyl chloride (PVC), polycarbonate (PC), polyethylene terephthalate (PET), and poly lactic acid (PLA).

5. The light reflective material of claim 1, wherein the extrusion base material comprises a plastic material.

6. The light reflective material of claim 1, wherein the light-reflective layer comprises glass beads.

7. A method of manufacturing a light reflective material, comprising:
   preparing an extrusion base material;
   supplying a light reflecting element on a surface of the extrusion base material and passing the extrusion base material through an extruder to form a light-reflective layer on the surface of the extrusion base material, wherein the light-reflective layer is provided in a form of plural rows separated from each other and wherein the extrusion base material comprises a groove pattern on a surface thereof; and
   sanding the surface of the light-reflective layer such that the extrusion base material is partially exposed through the light-reflective layer.

8. The method of claim 7, wherein the extruder comprises a pattern corresponding to the groove pattern.

9. The method of claim 7, wherein the extrusion base material is formed by extrusion.

10. The method of claim 7, wherein the extrusion base material comprises synthetic wood comprising wood flour and a resin.

11. The method of claim 10, wherein the synthetic wood comprises 20 to 50 parts by weight of the resin based on 100 parts by weight of the wood flour.

12. The method of claim 7, wherein the resin comprises at least one material selected among polypropylene (PP), polyethylene (PE), polyvinyl chloride (PVC), polycarbonate (PC), polyethylene terephthalate (PET), and poly lactic acid (PLA).

13. The method of claim 7, wherein the extrusion base material comprises a plastic material.

14. The method of claim 7, wherein the light-reflective layer comprises glass beads.

* * * * *